United States Patent [19]
Leo

[11] 3,918,480
[45] Nov. 11, 1975

[54] DEVICE FOR FEEDING GASES TO A FLAME CUTTING MACHINE

[75] Inventor: Heinz Leo, Seulberg, Taunus, Germany

[73] Assignee: Messer Griesheim GmbH, Frankfurt am Main, Germany

[22] Filed: Sept. 13, 1973

[21] Appl. No.: 397,105

[30] Foreign Application Priority Data
Sept. 25, 1972 Germany............................ 2247012

[52] U.S. Cl................................ 137/488; 137/599
[51] Int. Cl.²......................................... G05D 16/00
[58] Field of Search.................... 137/608, 488, 599

[56] References Cited
UNITED STATES PATENTS

| | | |
|---|---|---|
| 2,229,903 | 1/1941 | Schmohl et al.................... 137/599 |
| 2,344,583 | 3/1944 | Annin................................. 137/462 |
| 2,580,691 | 1/1952 | Miller.......................... 137/608 X |
| 3,228,671 | 1/1966 | Lyons................................ 266/23 |

*Primary Examiner*—Alan Cohan
*Assistant Examiner*—Gerald A. Michalsky
*Attorney, Agent, or Firm*—Connolly and Hutz

[57] ABSTRACT

A device for feeding gases to flame cutting machines includes a source of supply to the cutting torches with a main pipe line in which are provided a main cutoff valve and also a pressure regulator which responds to control pressure. At least one control line branches off the main pipe line and includes a control unit for the pressure regulator. A vent valve is arranged in the control line by means of which the control side of the pressure regulator is releasable from pressure and the pressure regulator closable.

2 Claims, 1 Drawing Figure

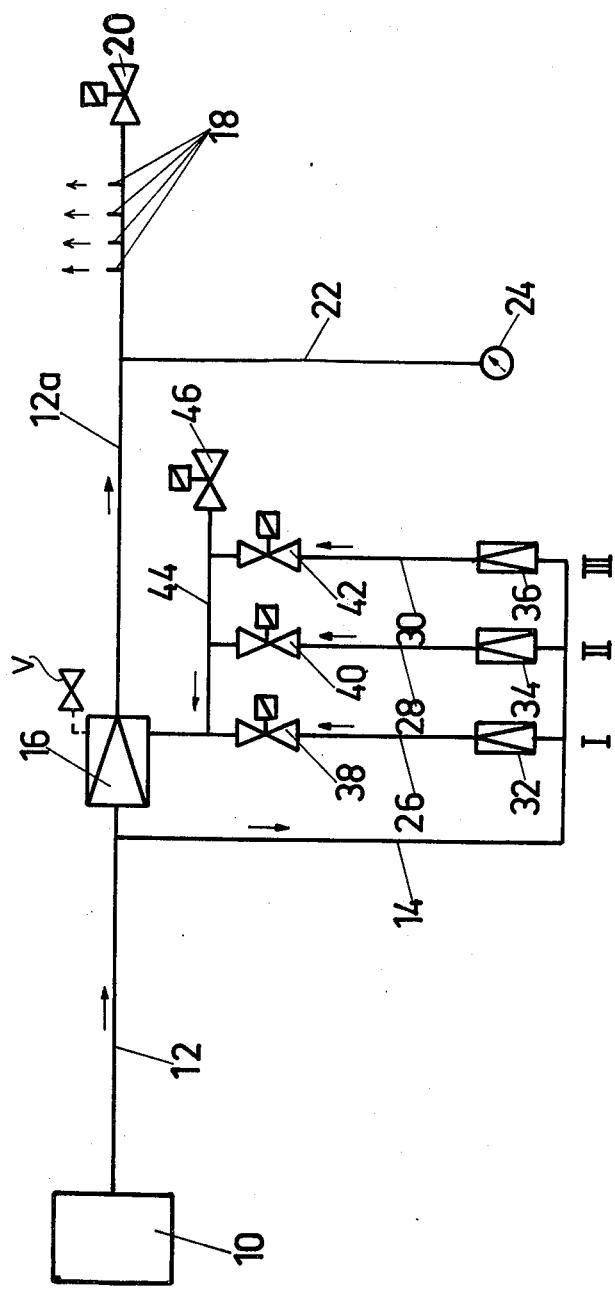

DEVICE FOR FEEDING GASES TO A FLAME CUTTING MACHINE

BACKGROUND OF THE INVENTION

This invention relates to a device for the feeding of gases, in particular of oxygen, from a supply source to one or several cutting burners or torches with a main pipe line, in which a main shutoff valve as well as a pressure regulator opening in dependence upon the ramming pressure, are arranged, and provided with at least one control line, in which a control unit for the pressure regulator is contained.

Devices of the above-mentioned type are for the purpose of producing, during the operation of the flame cutting machine different gas pressures. Therefore, with such a device it is possible to change the heating-oxygen from a low pressure to a higher pressure and vice versa. Due to the higher pressure of the heating-oxygen the heating-up period of the cutting place is considerably shortened, and by means of these known devices, it is, after reaching the ignition temperature of the material, switched back to normal (low) heating oxygen pressure, which remains maintained during the then starting cutting process when the cutting-oxygen is actuated.

With such devices it is naturally also possible to change the cutting-oxygen pressure, by switching it e.g., as it suitable for hole piercing, from a low cutting-oxygen pressure to the usual pressure during the cutting process.

However, when the known device is switched off, there remains unfortunately in the pipe lines a ramming pressure, which prevents the closing of the regulator of the working pressure. The existence of such a ramming pressure is disadvantageous above all, when after a shutdown the device is switched on again, so that the now newly flowing gas (oxygen) pushes the gas which is still dammed up from the last operation, out of the cutting burner, which, in particular at the beginning of a cutting process, leads due to the increased amount of oxygen, to an irregular cutting start, or respectively, in the case of hole piercing, to an undesirably large hole.

Therefore, it is the object of the present invention to create a device at whose switching off a closure of the regulator of the working process is guaranteed, and with which therefore furthermore upon renewed starting a clean out or perforation is guaranteed.

SUMMARY OF INVENTION

The solution of the problem is characterized by a vent valve arranged in the control line, by means of which the control side of the pressure regulator can be released and the pressure regulator closed.

Due to the venting of the control lines according to the invention, it is fortunately guaranteed that the valve regulating the working pressure closes independently, mechanically due to the pressure release and e.g. with the help of a spring. The pressure regulating valve, released from the control gas pressure, is able to close immediately the main pipe line — as mentioned — and thus serves furthermore, according to the invention, as a shutoff valve. Because of this advantageous double function of the valve regulating the working pressure, namely adjusting of the working pressure in each case, and shutting off the main pipe line, the main shutoff valve which is otherwise necessary is superfluous. Thus also the construction of the device according to the invention becomes simpler.

In the construction of the device according to the invention it is provided that the control pipe line comprises several parallel arranged branch lines and in each branch line a control unit, consisting of a regulator of the control pressure and a control valve behind it.

In the exemplified embodiment according to the invention, there are, as it will be explained more closely later on, provided three control units (pressure steps), each being preadjusted to a different, higher pressure. It is of course possible in an advantageous way, to provide more than three pressure steps in parallel connection to one another, and to control by them the working-pressure regulator. By using several control units, it is conceivable e.g. to regulate the cutting oxygen in steps, to obtain in this way, in dependence upon the thickness of the plate in each case, the optimum cutting-oxygen pressure by merely switching in the corresponding control unit. Consequently, a manual, time-consuming adjustment of the pressure is no longer necessary. This is especially of great advantage, when gas-cutting nozzles are used, which are suitable for a wide range of thickness of the workpieces, so that then it is merely necessary, to adapt the cutting-oxygen pressure to the thickness of the plate.

In this case it is then of special advantage, when the vent valve is arranged in a crossline, which unites the branch lines, seen in the direction of flow, behind the control valves. This arrangement of the vent valve guarantees in an advantageous way, that all branch lines of the control line, are vented between the respective control valve and the regulator of the working pressure.

THE DRAWINGS

The single FIGURE schematically illustrates the concepts of this invention.

DETAILED DESCRIPTION

The device according to the invention, shown in the drawing, is arranged in association with a gas-cutting machine (not shown). A main pipe line 12 comes from a source of supply e.g. a tank 10. From this main line a control line 14 branches off. Behind this branching place a regulator 16 of the working pressure is arranged in the main line 12 and as schematically illustrated regulator 16 also functions as a shut-off valve V. The main pipe line 12 is prolonged in part 12a of the line, starting from regulator 16 of the working pressure, to one or, as shown in the drawing, several connections 18, which form the connection to the cutting burners of the gas-cutting machine. Part 12a of the pipe line ends in a vent valve 20, arranged behind or downstream the connections 18, seen in the direction of flow of the gas.

In branch 22 of part 12a of the pipe line, there is provided furthermore a manometer 24, which indicates the working pressure prevailing at any time in pipe line part 12a (working pipe line).

As can be seen from the drawing, the control line 14 is divided into three branch lines 26, 28, 30. Each of these branch lines contains a control unit, consisting of a manually adjustable regulator of the control pressure 32, respectively 34 and 36, as well as each an electromagnetically operable control valve 38, 40, and 42, respectively, connected at the outlet side.

The branch lines 26, 28, 30 end as seen in the direction of flow - behind the control valves 38, 40, 42 in a crossline 44, which discharges with one of its ends on the control side of the regulator of the working pressure 16, into the latter. At the other end of the crossline 44, a second vent valve 46 is provided.

The pressure regulators, valves, etc., contained in the device of the invention, are of a conventional construction known per se and therefore do not require any more detailed explanation.

The above-described device according to the invention, takes care — as mentioned, of the regulation of the gases required for the gas cutting, e.g. cutting-oxygen.

The cutting-oxygen reaches at a pre-adjusted pressure from storage tank 10 the main pipe line 12, and from there the regulator of the working pressure 16. Depending upon the adjustment of the pressure regulator 16, by one of the control units 32, 38; 34, 40, and 36, 42, the cutting-oxygen reaches from the latter the cutting burners at a definite working pressure. A partial amount of the cutting-oxygen branched off from regulator 16 (control line 14), reaches via the regulators of the control pressure, 32, 34, and 36, which are manually preadjusted in their amount of passage, via the branch lines 26, 28, 30, the respective control valves 38, 40, 42.

The control unit 32, 38; 34, 40, and 36, 42, contained in each branch line, forms a pressure step I, II, and III of different size. In the operation of the device of the invention always only one of the three pressure steps is open.

| Pressure step I | rinsing -O$_2$ | valve 38 open, valves 40 and 42 closed |
| Pressure step II | hole-piercing-O$_2$ | valve 40 open, valves 38 and 42 closed |
| Pressure step III | cutting-O$_2$ | valve 42 open, valves 38 and 40 closed |

At the beginning of the gas cutting, first the pressure step I is connected and the regulator of the working pressure 16 is opened to a slight extent. In this way, oxygen reaches at first in a weak flow through pipe part 12a, the cutting burners, and thus presses out the infiltrated air present in the pipe line, so that at the actual start, oxygen reaches the cutting place at a high degree of purity. Therefore, the pipe line 12a and also the cutting burners, are "rinsed" by activation of pressure step I.

By activation of the control unit 34, 40 (pressure step II) the control unit 32, 38 (pressure step I) closes automatically, whereby, however, furthermore the regulator of the working pressure 16 is opened more due to the higher control pressure, so that therefore also the working pressure in pipe line part 12a increases to the oxygen required for the hole piercing. Instead of the hole piercing, when the cutting takes place within the work piece it is of course also possible to "use" pressure step II for the cutting of the work piece at its edge.

After the piercing and the cutting, respectively, have taken place, the control unit 36, 42 switches in (pressure step III), while at the same time control unit 34, 40 (pressure step II) switches off. since this control unit is adjusted again to another (lower or higher) control pressure value, the passage characteristic of the working pressure regulator 16 changes accordingly, so that now the cutting-oxygen pressure is built up for the proper cutting process.

The switching of the control units 32, 38; 34, 40 and 36, 42 takes place preferably automatically, e.g. via a timing relay.

After completion of the cutting process, the control valve 42 (pressure step III) is switched off. In order to now accomplish according to the invention that thereby also the regulator of the working pressure 16, closes immediately, the vent valve 46 provided in crossline 44, opens simultaneously so that the residual pressure (ramming pressure), which otherwise remains in this pipe line after closing control valve 42, is disintegrated immediately. Thus the control side of the regulator of the working pressure is released of pressure and can close at once. Therefore, the regulator of the working pressure 16 serves at the same time also in an advantageous way for the cutoff of main pipe line 12, so that a continuation of the flow of the cutting-oxygen to the connections 18 to the cutting burners, is prevented. This double function of the regulator of the working pressure (regulation and cutoff) makes it possible to eliminate a main cutoff valve, which is otherwise required.

The other vent valve 20, at the end of line part 12a, is opened preferably simultaneously with vent valve 46; however, also a brief delay in time of the opening of the vent valve 20 is conceivable. Therefore, by this valve, line part 12a is immediately vented at closed regulator of the working pressure 16, whereby the residual cutting-oxygen flows no longer out over the cutting burners, but takes the way of least resistance, conditioned by the greater surface of the discharge cross-section of vent valve 20, thus streaming out into the surroundings. Due to this immediate venting of line part 12a a smudgy cutting is prevented at the working piece.

Therefore, with the device according to the invention, it is possible to use the regulator of the venting and working pressure, not only for the regulation of the main pipe line, but also for the shutoff of the latter, since the ramming pressure, preventing the closing movement of the regulator of the working pressure, does no longer exist. Furthermore, as explained at the beginning, as many control units (pressure steps) as desired can be connected in series before the regulator of the working pressure, whereby the regulator of the working pressure remains unchanged in its structure. Moreover, this device according to the invention has besides a compact form of construction also a simple structure and therefore can be attached to the gas cutting machine without difficulties.

What is claimed is:

1. a device for feeding gas to a cutting machine with at least one cutting means, comprising, in combination, a source of gas supply, a main pipe line leading from said source of gas supply, a control and shut-off valve means in said main pipe line dividing said main pipe line into an upstream portion between said source of gas supply and said control and shut-off valve means and a downstream portion between said control and shut-off valve means and the cutting means, said control and shut-off valve means having an upstream side connected to said upstream portion of said main pipe line and having a control side downstream from said upstream side for controlling the amount of gas flowing therethrough into said downstream portion of said main pipe line, said downstream portion of said main pipe line leading from said control and shut-off valve means to the cutting means without any further shut-off valve therebetween, said control and shut-off valve means functioning for selectively opening and regulating and closing the flow of gas to the cutting means, a main control circuit having an upstream end and a downstream end, said upstream end being connected in flow communication to said upstream portion of said main pipe line, said downstream end being connected in flow communication to said control side of said control and shut-off valve means, said selective opening and regulating and closing of said control and shut-off valve means being in dependence with the pressure of the gas flowing through said main control circuit and to said control side of said control and shut-off valve means, said main control circuit having a plurality of parallel branch lines, each of said branch lines having an upstream end and a downstream end, the upstream ends of said branch lines being interconnected with each other and the downstream ends of said branch lines being interconnected with each other, each of said branch lines incorporating a control unit therein, each of the control units comprising a pressure regulator and a control valve for determining the control pressure flowing from its branch line to said control and shut-off valve means, a cross line extending across said branch lines and in flow communication therewith, said cross line being in flow communication with said control side of said control and shut-off valve means to comprise the connection of said main control circuit with said control and shut-off valve means whereby the pressure on said control side of said control and shut-off valve means is determined by the total pressure in said cross line from said branch lines, a vent valve in said cross line downstream from the pressure regulators and control valves of said branch lines control units, and said cross line having no valves between said vent valve and said control side of said control and shut-off valve means to render said control and shut-off valve means capable of immediate closing action in its function as a cut-off valve without any residual pressure between said control side and said branch lines control units to affect the subsequent re-opening of said control and shut-off valve means in its subsequent function as a regulating valve.

2. In the device of claim 1 wherein said branch lines have different flow capacity with respect to each other.

* * * * *